May 20, 1947. T. DOUMA 2,420,740
FREQUENCY-DOUBLING DEVICE FOR HIGH-FREQUENCY OSCILLATIONS
Filed March 17, 1943

INVENTOR
Tjiske Douma
BY H.S. Grover
ATTORNEY

Patented May 20, 1947

2,420,740

UNITED STATES PATENT OFFICE 2,420,740

FREQUENCY-DOUBLING DEVICE FOR HIGH-FREQUENCY OSCILLATIONS

Tjiske Douma, Eindhoven, Netherlands, assignor to Hartford National Bank and Trust Company, Hartford, Conn., as trustee Application March 17, 1943, Serial No. 479,464
In the Netherlands August 15, 1940

4 Claims. (Cl. 250—36)

This invention relates to a frequency-doubling device for high-frequency oscillations and more particularly for ultra-high frequency oscillations. In carrying out my invention, I use at least two discharge systems and supply an oscillation of the frequency to be doubled in phase-opposition to the anodes, the cathode or the control electrodes of the two systems, whilst either the cathodes, the anodes or the anodes and the cathodes of the systems are inter-connected. Moreover, a resonant circuit tuned to the double frequency is connected either between the interconnected electrodes and a point of a capacitative potentiometer connected between the points to which is supplied the oscillation of the frequency to be doubled. Alternatively, the anodes and the cathodes may be interconnected between the two sets of interconnected electrodes.

Frequency doublers of the prior art when used in the ultra high-frequency range having a wavelength of 1 metre, for instance, could be operated only at considerable loss of output energy. According to the invention such loss can be avoided for the greater part by choosing the elements of a double bridge-arrangement, the points of which bridge-arrangement are constituted by the points to which is supplied the oscillation of the frequency to be doubled, the ends of the said circuit and an earthed point of this circuit, and the branches of which bridge-arrangement comprise the electrode-capacities of the tubes and the parts of the said circuit on either side of the earthed point and, if desired, the capacities forming the capacitative potentiometer, in such manner that the supply points of the oscillation of the frequency to be doubled have substantially no alternating voltage of the double frequency with respect to earth.

The invention will be more clearly understood by reference to the accompanying drawing given by way of example.

Fig. 1 of the drawings shows a circuit diagram of a known frequency multiplier with respect to which applicant has devised certain improvements as hereinafter set forth;

Figure 1:
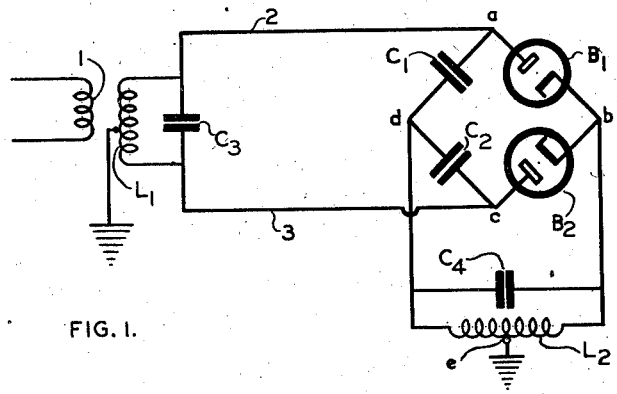

A known device of the generic class to which my invention belongs is shown in Figure 1 and comprises two diodes. In this device an oscillation of the frequency to be doubled is supplied to a coupling coil $l$ which is coupled with an inductance $L_1$. The inductance $L_1$ together with a condenser $C_3$ constitutes an oscillatory circuit $L_1C_3$ which is tuned to the frequency to be doubled and whose ends are connected through the intermediary of two leads 2 and 3 to two opposed corner points $a$ and $c$ of a bridge-arrangement. The bridge-arrangement whose corner points are denoted by $a$, $b$, $c$ and $d$ comprises in the branches the diodes $B_1$ and $B_2$ and the mutually equal condensers $C_1$ and $C_2$. The cathodes of the diodes $B_1$ and $B_2$ are interconnected and constitute the corner point $b$, the junction point of the condensers $C_1$ and $C_2$ constituting the corner point $d$. Between the corner points $b$ and $d$ is connected a resonant circuit which is tuned to the double frequency and consists of a condenser $C_4$ and an inductance $L_2$. Point $e$ of the inductance $L_2$ is grounded as well as a point of the inductance $L_1$.

The arrangement described above permits the derivation of oscillations from the circuit $L_2C_4$ whose frequency is double that of the oscillations supplied to the circuit $L_1C_3$.

It has been found that when making use of the circuit-arrangement shown in Fig. 1 for frequency-multiplication of ultra-high frequencies having, for instance, a wavelength of 1 metre and less, considerable losses occur. But my invention is based on a recognition of the fact that these losses are caused by the existence at the points $a$ and $c$ of a considerable alternating voltage of the double frequency relatively to point $e$. Hence the circuit parts connected to points $a$ and $c$, for instance the connecting leads 2 and 3, radiate a part of the energy of the generated oscillation of the double frequency into the surrounding space. Since the points $a$ and $c$ have the same phase for the oscillation of the double frequency it is not feasible to eliminate the radiation of leads 2 and 3 by bringing these leads close together.

According to the invention the losses due to radiation can be reduced to a much smaller value by choosing the elements of the double bridge-arrangement, whose corner points are $a$, $b$, $c$ and $d$ and whose branches are constituted by the capacities $C_1$ and $C_2$, the anode-cathode capacities of tubes $B_1$ and $B_2$ and the parts of the circuit $L_2C_4$ on either side of point $e$, in such manner that at the points $a$ and $c$ there is substantially no alternating voltage of the double frequency relative to earth.

In fact, when considering the circuit-arrangement shown in Fig. 1 it appears that one bridge is constituted by the elements $C_1$, $B_1$ and the two parts of the circuit $L_2C_4$ on either side of point $e$, whereas the other bridge consists of the elements $C_2$, $B_2$, and again of the two above-mentioned parts of the circuit $L_2C_4$. To balance these two bridges for the double frequency the ratio of the impedances of the bridge branches $bc$ and $cd$ as well as the ratio of the impedances of the bridge branches $ab$ and $ad$ must be equal to the ratio of the impedances of the bridge branches $be$ and $de$.

The electric centre of circuit $L_2C_4$ is preferably earthed and the capacities $C_1$ and $C_2$ are experimentally so chosen as to render the said ratios equal to each other.

In the present case the impedance of the branches $ab$ and $be$ is to be understood exclusively to mean the impedance of the anode-cathode capacity of tubes $B_1$ and $B_2$. During the moments in which one of the diodes $B_1$ and $B_2$ is conductive the internal resistance of this diode is connected in parallel with the said impedance so that the balance of the bridge is broken. However, the diodes $B_1$ and $B_2$ are alternately conductive only during a small part of the period of the oscillation to be frequency-doubled, so that the periodic interruption of the balance of the bridge only slightly affects the voltage set up between points $a$, $c$ and $e$.

Figure 2:
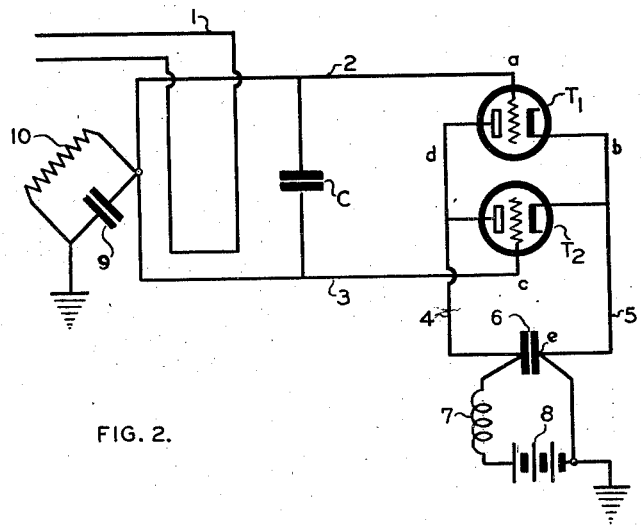
Fig. 2 shows a preferred embodiment of applicant's invention.

Figure 2 represents one form of construction of the device according to the invention, which comprises two triodes $T_1$ and $T_2$. In this case the circuit tuned to the frequency to be doubled is formed by combining the conductors 2 and 3 with an earthed Lecher-line which is short-circuited on one side and whose length is one fourth of the wave-length of the oscillation whose frequency must be doubled. The line 2, 3 can be re-adjusted by means of a condenser C. The free ends of the Lecher-line 2, 3 are connected to the control grids of the triodes $T_1$ and $T_2$ respectively. The anodes and the cathodes of these tubes are respectively interconnected and connected to the ends of a second Lecher-line 4, 5 which is short-circuited and earthed on the other side and whose electric length is slightly less than one fourth of the wave-length of the oscillation of the double frequency. This lead constitutes the resonant circuit tuned to the double frequency.

Figure 3:
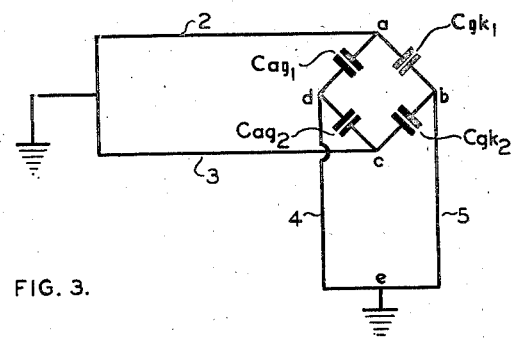
Fig. 3 shows a diagram representing capacitive equivalents of the interelectrode capacities in the discharge tubes of the circuit arrangement of Fig. 2.

Fig. 3 is referred to in explanation of the inter-electrode capacitance relationships involved in the circuit according to Fig. 2. $Cag_1$ and $Cag_2$ represent the anode-grid capacities and $Cgk_1$ and $Cgk_2$ the grid-cathode capacities of tubes $T_1$ and $T_2$ respectively. These capacities together with the parts of the circuit 4, 5 on either side of the earthed point ($e$) constitute a double bridge-arrangement whose corner points, similarly to Figure 1, are denoted by $a$, $b$, $c$, $d$ and $e$. Between the impedances of the bridge branches $ab$, $be$, $cd$, $ad$, $bc$ and $de$ the relation stated already with reference to Figure 1 should exist. All of the capacities in the bridge branches $ab$, $bc$, $cd$, and $de$ in the arrangement shown in Figure 3 being electrode capacities which can be modified only by the insertion of additional capacities—which is undesirable at very high frequencies—the Lecher-line 4, 5 tuned to the double frequency can also be arranged in such manner that the ratio of the impedances of the bridge branches $be$ and $de$ for the double frequency corresponds to the ratio of the impedances of the bridge branches $bc$ and $cd$ and to the ratio of the impedances of the bridge branches $ab$ and $ad$. In this case it has been assumed that the last-mentioned two ratios are already equal; this can be ensured when making use of uniform tubes and a symmetrical construction. According to the invention the ratio of the impedances of the bridge branches $be$ and $de$ can be adjusted by giving the conductors 4 and 5 different cross-sections. When giving, for instance, the conductor 5 a larger cross-section than the conductor 4 it can be ensured that the impedance of the branch $be$ of the bridge is smaller than that of branch $de$.

I claim:

1. A frequency doubling device for use in the ultra-high frequency range, said device comprising a pair of discharge tubes each having a cathode, an anode, and a control grid, said cathodes being interconnected and said anodes being interconnected, a resonant circuit fed with energy from a given alternating current source and tuned to the fundamental frequency thereof, said resonant circuit constituting part of a Lecher-wire system which interconnects said resonant circuit and the grids of said tubes in such manner that said grids are excited in phase opposition, a ground connection to a nodal point of alternating potential on said Lecher-wire system, a second Lecher-wire system constituting an output circuit common to the two said tubes and connected from their cathodes to their anodes, said output circuit being tuned to the second harmonic of said fundamental frequency, said device being further characterized in that the inter-electrode capacitances of said tubes constitute the main impedances of a balanced bridge circuit whereby radiation losses at the second harmonic frequency through the first said Lecher-wire system are minimized.

2. A frequency multiplier comprising two electron discharge devices each having a cathode, an anode and a control grid, Lecher-wire means for supplying input potentials of the fundamental frequency in phase opposition to like electrodes in the two said devices, Lecher-wire means for establishing parallel output circuit connections through the two space paths of said devices, a parallel-resonant circuit tuned to a harmonic of said fundamental frequency and connected across unlike electrodes of said devices, a ground connection to a nodal point of alternating potential on said parallel-resonant circuit, and means operable in dependence upon the balancing of impedance values assigned to the inter-electrode capacitances of said tubes, and also in dependence upon the disposition of said ground connection for excluding from the circuit of the input supply means alternating potentials of said harmonic frequency.

3. A frequency multiplier comprising two electron discharge devices each having a cathode, an anode and a control grid, Lecher-wire means for supplying input potentials of the fundamental frequency in phase opposition to like electrodes in the two said devices, Lecher-wire means for establishing parallel output circuit connections through the two space paths of said devices, means for tuning said output circuit connections to the second harmonic of said fundamental frequency, and ground connections at nodal points of alternating potentials on the two said Lecher-wire means remote from their connections to the electrodes of said tubes, said connections being disposed at the four junctions of a balanced bridge circuit in which the arms of impedance are represented respectively by the anode-grid capacitances and the grid-cathode capacitances of said tubes.

4. A frequency multiplier according to claim 3 and being further characterized by conductors of unequal cross-section in the Lecher-wire means of the output circuit, the inequality of cross-section being effective in reducing the impedance of a conductor which connects the cathodes of said tubes to ground as compared with the conductor which is disposed parallel thereto.

TJISKE DOUMA.

REFERENCES CITED

The following references are of record in the file of this patent:

UNITED STATES PATENTS

| Number | Name | Date |
|---|---|---|
| 1,754,749 | Gerth | Apr. 15, 1930 |
| 2,052,888 | Lindenblad | Sept. 1, 1936 |
| 2,190,731 | Posthumus | Feb. 20, 1940 |
| 2,253,849 | Dow | Aug. 26, 1941 |
| 2,323,672 | Nelson | July 6, 1943 |